United States Patent
Cazaux et al.

(10) Patent No.: US 11,056,011 B2
(45) Date of Patent: Jul. 6, 2021

(54) METHOD AND ELECTRONIC DEVICE OF MANAGEMENT OF THE DISPLAY OF AN AIRCRAFT FLYING PROFILE, ASSOCIATED COMPUTER PROGRAM AND ELECTRONIC SYSTEM

(71) Applicant: THALES, Courbevoie (FR)

(72) Inventors: Patrick Cazaux, Merignac (FR); Norbert Frestel, Merignac (FR); Geoffrey Nicollet, Merignac (FR)

(73) Assignee: THALES, Courbevoie (FR)

(*) Notice: Subject to any disclaimer, the term of this patent is extended or adjusted under 35 U.S.C. 154(b) by 250 days.

(21) Appl. No.: 16/421,637

(22) Filed: May 24, 2019

(65) Prior Publication Data
US 2019/0362635 A1  Nov. 28, 2019

(30) Foreign Application Priority Data
May 25, 2018 (FR) .................... 18 00510

(51) Int. Cl.
*G08G 5/00* (2006.01)
*G05D 1/10* (2006.01)
(Continued)

(52) U.S. Cl.
CPC ............ *G08G 5/006* (2013.01); *B64D 45/00* (2013.01); *G05D 1/101* (2013.01); *G08G 5/003* (2013.01); *G08G 5/0021* (2013.01); *G08G 5/025* (2013.01)

(58) Field of Classification Search
CPC .... G08G 5/0047; G08G 5/0052; G08G 5/006; G08G 5/0069; G08G 5/0073;
(Continued)

(56) References Cited

U.S. PATENT DOCUMENTS

| 5,739,770 A * | 4/1998 | Liden .................. G05D 1/0676 340/976 |
| 8,581,748 B1 * | 11/2013 | Barber .................. G08G 5/025 340/971 |
| 8,793,039 B1 | 7/2014 | Hammack et al. |

(Continued)

FOREIGN PATENT DOCUMENTS

CA    2245246 A1    8/1997

OTHER PUBLICATIONS

FR Search Report, dated Feb. 13, 2019, from corresponding FR application No. 18 00510.

*Primary Examiner* — Thomas G Black
*Assistant Examiner* — Sara J Lewandroski
(74) *Attorney, Agent, or Firm* — Nixon & Vanderhye

(57) ABSTRACT

A method for managing the display of a vertical flight profile of an aircraft includes: determining a deviation between a predefined lateral trajectory and the current position of the aircraft projected in the plane of the trajectory; as a function of at least the determined deviation, selecting a display mode of the vertical flight profile from among a first mode and a second mode. When the first mode has been selected, calculating the distance between the orthogonal projection of the current position of the aircraft on the trajectory and the orthogonal projection of the next waypoint on the trajectory, and displaying, in the vertical flight profile, the next waypoint at a distance from the aircraft along a reference axis equal to the distance. When the second mode has been selected, calculating the distance instead from the current position of the aircraft in the plane of the trajectory.

16 Claims, 5 Drawing Sheets

(51) Int. Cl.
*B64D 45/00* (2006.01)
*G08G 5/02* (2006.01)

(58) Field of Classification Search
CPC ........ G08G 5/0095; G08G 5/02; G08G 5/025; G08G 5/021; B64C 19/00; B64C 19/02; B64D 45/00
See application file for complete search history.

(56) References Cited

U.S. PATENT DOCUMENTS

| | | | | |
|---|---|---|---|---|
| 8,798,815 B1* | 8/2014 | Burgin | .................... | B64D 45/00 701/9 |
| 8,948,939 B2* | 2/2015 | Putz | .................... | G05D 1/0202 701/18 |
| 9,972,143 B1* | 5/2018 | Garai | .................... | B64D 45/00 |
| 2002/0099528 A1* | 7/2002 | Hett | .................... | G01C 23/005 703/13 |
| 2008/0103646 A1* | 5/2008 | Lucas | .................... | G08G 5/0039 701/14 |
| 2008/0140270 A1* | 6/2008 | Davis | .................... | G08G 5/0021 701/8 |
| 2011/0137495 A1* | 6/2011 | Sacle | .................... | G05D 1/0676 701/3 |
| 2012/0296496 A1* | 11/2012 | Hedrick | .................... | G05D 1/0077 701/3 |
| 2013/0218373 A1* | 8/2013 | Hedrick | .................... | G01D 7/002 701/14 |
| 2013/0245861 A1 | 9/2013 | Putz et al. | | |
| 2014/0148979 A1* | 5/2014 | De Prins | .................... | G01C 23/005 701/3 |
| 2015/0262490 A1* | 9/2015 | Deker | .................... | G08G 5/0021 701/3 |
| 2015/0375872 A1* | 12/2015 | Canale | .................... | G08G 5/025 701/16 |
| 2017/0008640 A1* | 1/2017 | Mere | .................... | B64D 45/00 |
| 2019/0155280 A1* | 5/2019 | Venkataramana | .................... | B64D 43/00 |

\* cited by examiner

METHOD AND ELECTRONIC DEVICE OF MANAGEMENT OF THE DISPLAY OF AN AIRCRAFT FLYING PROFILE, ASSOCIATED COMPUTER PROGRAM AND ELECTRONIC SYSTEM

TECHNICAL FIELD

The present invention relates to a method for managing the display of a flight profile of an aircraft, the method being implemented by an electronic display management device.

BACKGROUND

The display of a flight profile of the aircraft on a display screen is generally, as shown in FIG. 1, separated into 2 separate zones, namely a first zone for displaying a horizontal flight profile 16', also called navigation display and denoted ND and a second zone for displaying a vertical flight profile 14', also called vertical display and denoted VD.

The horizontal flight profile is a projection of the flight profile in a horizontal plane and is also called lateral trajectory, and the vertical flight profile is a projection of the flight profile in a vertical plane, perpendicular to the horizontal plane and is also called vertical trajectory.

The horizontal axis of the vertical profile is defined by following the segments of the flight plan (rectilinear and curvilinear) defined by waypoints. These points are defined by geographical coordinates. They are used, in particular by trajectory building tools like the FMS (Flight Management System) or by the pilots, to define the trajectories from a starting point to a destination point. They can be embodied by readings on specific daymarks, radio beacons, GPS position readings, they may designate points at which, during the trajectory, changes of heading or other constraints to be respected must occur (for example, need to pass by a waypoint, etc.). The waypoints and their function are known in themselves.

The VD as displayed in flight plan mode thus generally includes the altitude of the aircraft and its relative position at the destination (the symbol 22' considered in FIG. 1 depicts a helicopter), the vertical speed vector describing the future trend of the aircraft, the altitude of the elements of the flight plan relative to the aircraft and the distance to reach them from the current position of the aircraft. It may further comprise the vertical information of the Automatic Pilot (example: selected altitude), the terrain present below the airplane and in the horizontal axis of the VD, the weather, the traffic (generally all information found in the horizontal axis of the VD and having an altitude: air sectors, safety altitudes, etc.).

In some cases, during the use of a device for managing the display of a flight profile of an aircraft, a user, such as a pilot of the aircraft, has the possibility of displaying the flight profile in track mode, which is also known.

In track mode or in flight plan mode, the vertical reference axis is defined along the axis of the standard barometric or baro-corrected altitudes, corresponding to the QNH aeronautic code.

The invention more particularly relates to a method for managing the display of a vertical flight profile of an aircraft for which a trajectory has been predefined by a flight plan comprising a set of waypoint(s), the method being implemented by an electronic management device and comprising the following step:

displaying a vertical flight profile of the aircraft comprising a first reference axis on the y-axis representing the altitude and a second reference axis on the x-axis representing a distance, and representing, relative to these axes, the position of the aircraft, and at least the next waypoint along the trajectory predefined by a flight plan of the aircraft.

When an aircraft is no longer guided according to the lateral trajectory defined by the flight plan and/or moves away from it, and even if the aircraft follows the lateral trajectory, continuing to depict the aircraft on the VD in flight plan mode as if it were nominally on the lateral trajectory entails an interpretation risk for the current situation.

Two solutions to address this problem are currently used.

The simplest solution is to no longer display the VD, by deleting the displayed information, which obviously causes the VD to lose all interest.

The most widespread solution consists of automatically placing the VD in track mode, by implementing complex algorithms to determine, as closely as possible, the passage to track mode and the return to flight plan mode. However, this solution results in causing the loss of the vertical references of the flight plan mode on the VD display. The pilot no longer directly sees the altitude of the waypoint he will need to reach if he must rejoin the flight plan. This solution also has the drawback of requiring a VD display in track mode, which requires development and computing resources for a limited operational contribution.

Furthermore, these solutions both result in causing an abrupt automatic transition of the VD between two completely different presentations, which risks attracting the pilot's eye, distracting him from his current task and harming piloting efficiency.

SUMMARY

To that end, according to a first aspect, the invention proposes a method for managing the display of a vertical flight profile of the aforementioned type, characterized in that:

the predefined lateral trajectory being the predefined trajectory projected in a plane perpendicular to the first axis, determining a deviation between the current position of the aircraft projected in said plane perpendicular to the first axis and the predefined lateral trajectory;

as a function of at least the determined deviation, selecting a mode from among a set of display modes of said vertical flight profile comprising at least a first mode and a second mode; and when the first mode has been selected, calculating a first value equal to the distance between the orthogonal projection of the current position of the aircraft on the predefined lateral trajectory and the orthogonal projection of the next waypoint of the aircraft on the predefined lateral trajectory, and displaying, in the vertical flight profile, the next waypoint at a distance from the aircraft along the second reference axis equal to the first calculated value;

when the second mode has been selected, calculating a second value equal to the distance between the current position of the aircraft considered in the plane of the lateral trajectory and the orthogonal projection of the next waypoint of the aircraft on the predefined lateral trajectory, and displaying, in the vertical flight profile, the next waypoint at a distance from the aircraft along the second reference axis equal to said second calculated value.

The invention thus makes it possible, even in case of noncompliance of the route of the aircraft with the trajectory according to the flight plan, to display, at all times, the VD including at least the next waypoint of the flight plan, while taking into account the drift relative to the latter, which makes it possible to anticipate a future rejoining of the flight plan by the pilot.

The invention makes it possible to view, on the VD, the beginning of the distancing of the current position of the aircraft from the lateral trajectory. The transition is gentle between the first and second display modes according to the invention.

In embodiments, the method for managing the display of a vertical flight profile according to the invention further includes one or more of the following features:
the first mode is selected when the determined deviation is below a first deviation threshold and the second mode is selected when the determined deviation is above said first deviation threshold;
the first deviation threshold is defined as a ratio of a required positioning precision on the current portion of the trajectory according to the flight plan;
the method comprises the following steps:
comparing the determined deviation to a second deviation threshold lower than the first deviation threshold, and
if the determined deviation is above the second deviation threshold, displaying, on the vertical flight profile, an indication signaling that the aircraft has moved away from the predefined trajectory;
the distance corresponding to said first value and/or said second value and/or said deviation is calculated as orthodromic distance;
the selection of said mode is further a function of received information indicating whether the flight of the aircraft is currently automatically slaved to said predefined trajectory.

According to a second aspect, the present invention proposes a computer program comprising software instructions which, when executed by a computer, carry out a method as defined above.

According to a third aspect, the present invention proposes an electronic device for managing the display of a vertical flight profile of an aircraft for which a trajectory has been predefined by a flight plan comprising a set of waypoint(s), said electronic device being suitable for
defining the display of a vertical flight profile of the aircraft comprising a first reference axis on the y-axis representing the altitude and a second reference axis on the x-axis representing a distance, and indicating, relative to these axes, the position of the aircraft, and at least the next waypoint along the predefined trajectory;
said device being characterized in that:
the device is capable, the predefined lateral trajectory being the predefined trajectory projected in a plane perpendicular to the first axis, of determining a deviation between the current position of the aircraft projected in said plane perpendicular to the first axis and the predefined lateral trajectory;
the devices capable, as a function of at least the determined deviation, of selecting a mode from among a set of display modes of said vertical flight profile comprising at least a first mode and a second mode; and
in order, when the first mode has been selected, calculating a first value equal to the distance between the orthogonal projection of the current position of the aircraft on the predefined lateral trajectory and the orthogonal projection of the next waypoint of the aircraft on the predefined lateral trajectory, to command the display, in the vertical flight profile, of the next waypoint at a distance from the aircraft along the second reference axis equal to the first calculated value;
in order, when the second mode has been selected, calculating a second value equal to the distance between the current position of the aircraft considered in the plane of the lateral trajectory and the orthogonal projection of the next waypoint of the aircraft on the predefined lateral trajectory, to command the display, in the vertical flight profile, of the next waypoint at a distance from the aircraft along the second reference axis equal to said second calculated value.

According to a fourth aspect, the present invention proposes an electronic system for displaying a flight profile of an aircraft, the system comprising:
a display screen; and
an electronic management device configured to command the display of the flight profile on the display screen, characterized in that the electronic management device is a device according to the third aspect of the invention.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 3:
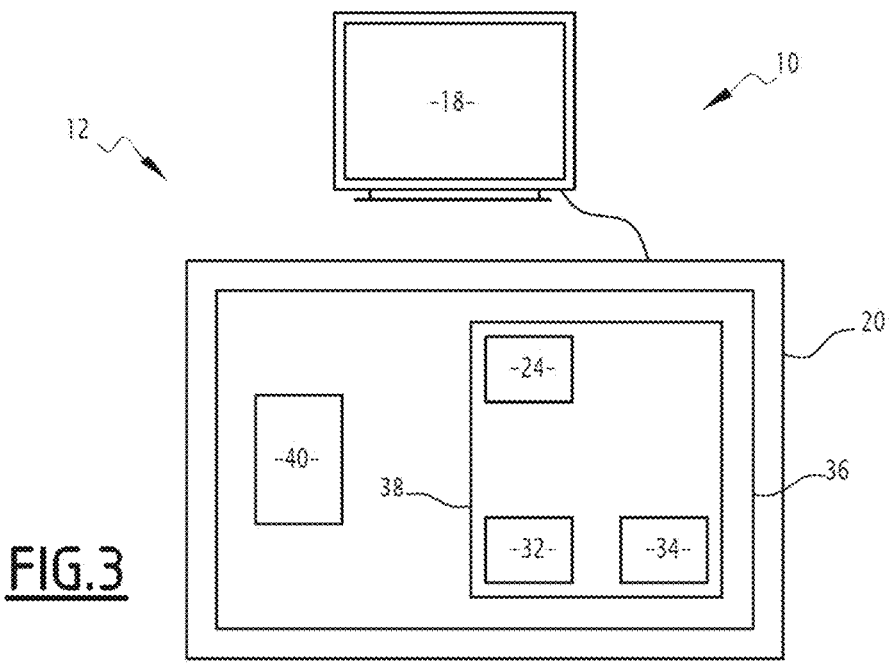
FIG. 3 is a schematic view of an electronic display system according to the invention, configured to display a flight profile of an aircraft.

In FIG. 3, an electronic display system 10 is configured to display at least one flight profile of an aircraft 12, namely a vertical flight profile 14 and/or a horizontal flight profile.

The electronic display system 10 comprises a display screen 18 and an electronic management device 20 that is configured to manage the display of at least one flight profile on the display screen 18, the management device 20 being connected to the display screen 18. The invention thus relates to the field of man-machine interfaces (MMI) for piloting an aircraft, for example intended to be installed in an aircraft cockpit.

The aircraft 12 is for example an airplane, as shown in FIGS. 5 to 10, where a symbol 22 depicting the aircraft 12 displayed on the vertical flight profiles 14 is in the shape of an airplane. Alternatively, the aircraft 12 is a helicopter or a drone piloted remotely by a pilot, etc.

The flight profile of the aircraft 12 is known in itself, and corresponds to an estimate of the trajectory that the aircraft 12 will follow during the continuation of its flight as predefined by the flight plan, in particular based on geographical coordinates of waypoints (here referenced P1, P2, P3, etc.) all along the trajectory, for example in the form longitude, latitude, altitude.

The vertical flight profile 14 is known in itself, and is a projection of the flight profile of the aircraft in a vertical plane containing a vertical reference axis and a horizontal reference axis. The vertical reference axis is defined along the axis of the standard barometric or baro-corrected altitudes, corresponding to the QNH aeronautic code. It is called Z in FIGS. 5-10.

The horizontal profile 16 is also known in itself, and is a projection of the flight profile of the aircraft 12 in a horizontal plane perpendicular to the vertical plane.

When the selected display mode is the flight plan mode, the horizontal reference axis is defined by following the segments of the flight plan, rectilinear and curvilinear; in the present case, the direction of the horizontal axis is defined along the projection on the ground of the flight plan segment (rectilinear/curvilinear) currently being traveled. The electronic management device 20 comprises a calculating module 24 configured to determine the definition data of the vertical profile to be displayed on the display screen 18. It is in particular configured to define, in a known manner, the horizontal X and vertical Z axes of the vertical profile, in particular the scale used for each of the axes X, Z, in order to obtain the current geographical coordinates of the aircraft 12 (for example provided by an on-board GPS/altimeter) and the geographical coordinates of the next waypoint (or even the next N waypoints, with N>1) appearing in the flight plan. The calculating module 24 is further suitable for determining a deviation Δ between the current position of the aircraft 12 and the predefined lateral trajectory both projected in a plane perpendicular to the axis Z in order to select, as a function of the determined deviation, a display mode of the vertical profile from among at least two modes A and B, each of these modes being associated with a respective mode for calculating the distance separating, in the vertical profile, the symbol 22 representing the aircraft 12 from the next waypoint along the axis X.

The deviation Δ between the current position of the aircraft 12 and the predefined lateral trajectory is determined by the calculating module 24 by calculating the distance between the aircraft 12 and the lateral trajectory. The calculated distance is for example the orthodromic distance (projection on a sphere having the Earth's radius) between the aircraft and its orthogonal projection point on the lateral trajectory or, when the distance is small (<10 Nm), the distance, in a plane perpendicular to the axis Z, between the orthogonal projections, in this plane, of the aircraft and this point.

The management device 20 comprises a display module 34 configured to command, on the display screen 18, the display of the flight profile, in particular the vertical profile 14, defined by the calculating module 24.

In the particular considered example, the management device 20 for example further comprises an acquisition module 32 configured to acquire a mode selected from among a managed mode and a non-managed mode. The managed mode is the mode in which the automatic pilot (PA) of the airplane is slaved to the predefined trajectory in the flight plan mode and provided by the FMS (examples: PA LNAV (lateral navigation) and/or PA VNAV (vertical navigation) modes) and the non-managed mode is the mode in which the automatic pilot of the airplane is not slaved to the trajectory provided by the FMS (examples: PA HDG (heading) mode or manual mode). The managed or non-managed mode is selected by the pilot of the airplane or by an electronic module.

Figure 1:
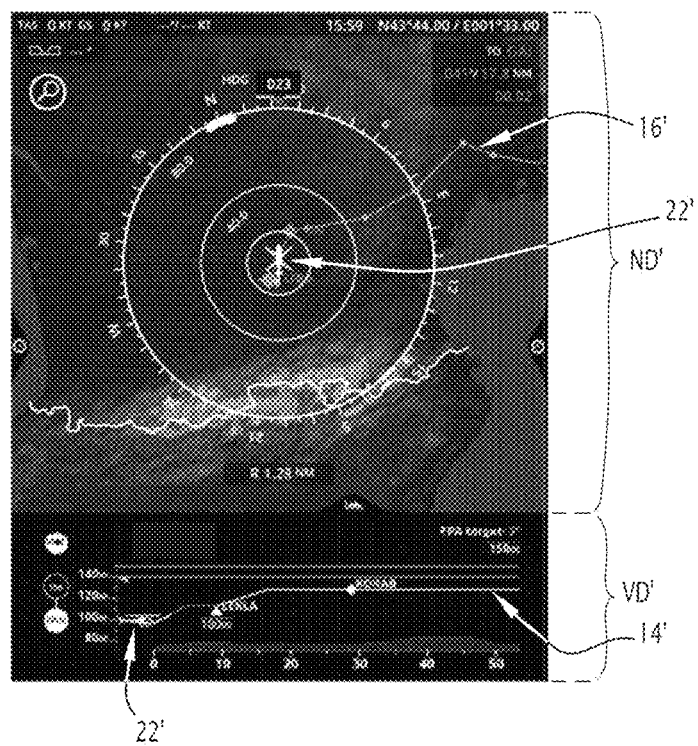
FIG. 1 is a view illustrating a flight profile, as displayed on the screen of a display system, in the prior art, separated into two separate zones with a first zone for displaying a horizontal flight profile ND' and a second zone for displaying a vertical flight profile VD'.
Figure 2:
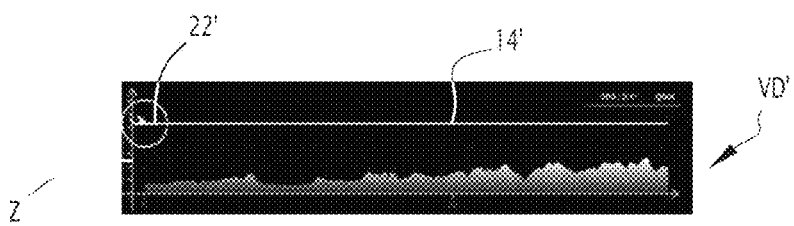
FIG. 2 is a view of the vertical flight profile, displayed on the vertical display VD' of the prior art of FIG. 1, when the display mode is a tracking mode.

In the example of FIG. 1, the electronic management device 20 comprises an information processing unit 36, for example made up of a memory 38 and a processor 40 associated with the memory 38.

In the example of FIG. 1, the calculating module 24 as well as, in the specific considered embodiment, the acquisition module 32 and the display module 34, are each made in the form of software, or add-on software, executable by the processor 40. The memory 38 of the electronic management device 20 is then able to store the software instructions of this software or add-on software.

In an alternative that is not shown, the calculating module 24, the acquisition module 32 and/or the display module 36 are made in the form of respective programmable logic components, such as an FPGA (Field Programmable Gate Array), or in the form of a dedicated integrated circuit, such as an ASIC (Applications Specific Integrated Circuit).

When the electronic management device 20 is made in whole or in part in the form of one or several software programs, i.e., in the form of a computer program, it is further able to be stored in whole or in part on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 4:
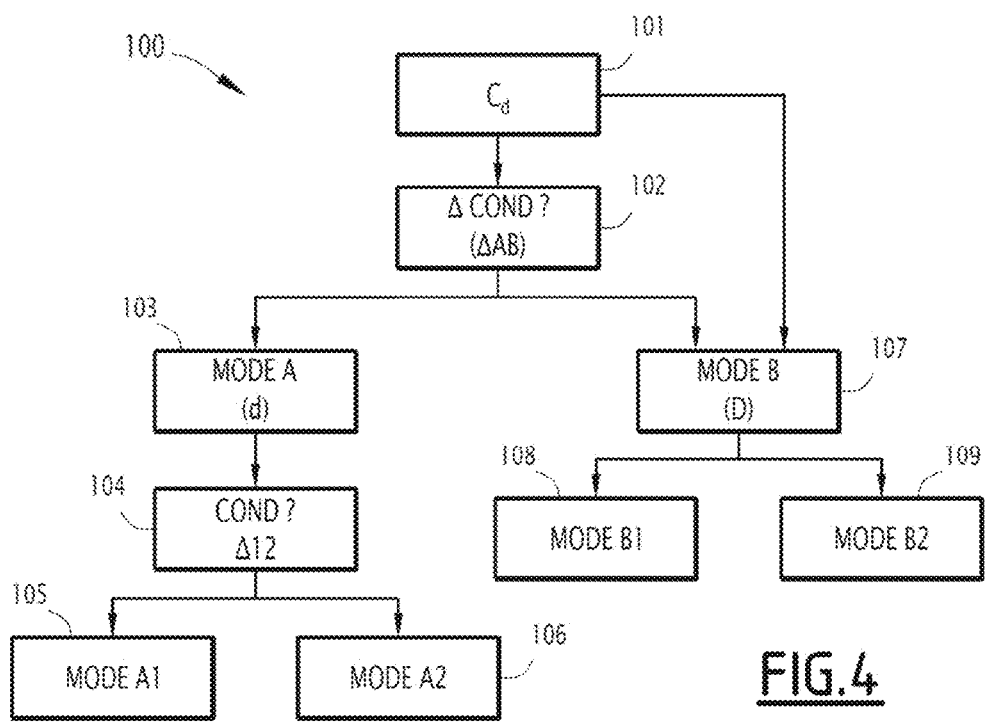
FIG. 4 is a flowchart of steps implemented in one embodiment of the invention.

The operation of the electronic management device 20 will now be explained using FIG. 4, showing a flowchart of the method, according to the invention, for managing the display of a flight profile of the aircraft 12, in particular the vertical flight profile 14, the method 100 being implemented by the management device 20, and reiterated at a given frequency f, for example with f∈[1 Hz, 100 Hz].

During an initial step 101, the management device 20 acquires, via its acquisition module 32, the piloting mode Cd that was selected from among the managed and non-managed modes.

If the selected piloting mode Cd is the non-managed mode, the management device 20 goes directly to step 107.

If the selected piloting mode Cd is the managed mode, in a step 102, the management device 20, via the calculating module 24, obtains the current geographical coordinates of the aircraft 12 (for example supplied by an on-board GPS/ altimeter) and determines the deviation Δ between the current position of the aircraft 12 and the predefined trajectory as previously defined.

Then the calculating module 24 compares the determined deviation Δ to a threshold ΔAB. If the determined deviation Δ is below the threshold ΔAB, the calculating module 24 performs step 103; otherwise, the calculating module 24 performs step 107.

In step 103 corresponding to a mode called mode A for determining the vertical profile 14, the calculating module 24 defines, in a known manner, the horizontal axis X and the vertical axis Z of the vertical profile, including the scale used for each of these axes; it extracts the geographical coordinates of the next waypoint (or the next N waypoints) from the flight plan. The calculating module 24 determines the location on the vertical profile 14 where the symbol 22 of the aircraft 12 will be displayed: it generally corresponds to the 0 graduation of the axis X and the value of Z equal to the current altitude determined for the aircraft. Then it determines the location on the vertical profile of the next waypoint P2 as follows: the coordinate of P2 on the axis X is separated from the value d of the coordinate of the symbol 22 along the axis X (in the present case 0) and the coordinate of P2 on the axis Z is taken to be equal to the altitude of the point P2 according to the flight plan, where the value d is calculated by the calculating module 24 as described hereinafter in reference to FIG. 7, then FIG. 5.

Figure 7:
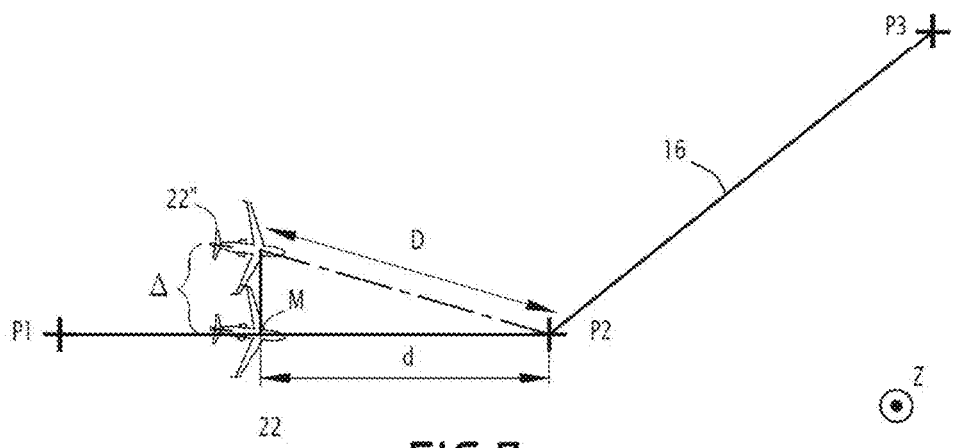
FIG. 7 is a schematic view of a horizontal flight profile in flight plan mode according to the invention, illustrating the different distance calculations in one embodiment of the invention.

FIG. 7 schematically shows a sectional view of the lateral trajectory (or horizontal flight profile) 16 of an aircraft 12, predefined by the waypoints P1, P2 and P3 of the flight plan. In the considered case, the aircraft has already passed the waypoint P1 and is moving toward the next waypoint P2.

In mode A (and sub-modes A1 and A2 of mode A in question later), d is determined as being equal to the distance between the orthogonal projection of the current position of the aircraft on the predefined lateral trajectory 16 and the orthogonal projection of the next waypoint of the aircraft on the predefined lateral trajectory (in the case of FIG. 7, P2 is located on the lateral trajectory). In one embodiment, d is equal to the orthodromic distance between the orthogonal projection of the current position of the aircraft on the predefined lateral trajectory 16 and the orthogonal projection of the next waypoint of the aircraft on the predefined lateral trajectory; in another embodiment, in particular when d is less than 10 Nm, d is determined as the length of the rectilinear segment between these two projections.

Two alternative situations are shown in FIG. 7. In one situation, the aircraft 12 is situated on the lateral trajectory and is then shown by the symbol 22 located at point M. In another situation, the aircraft 12 is situated outside the lateral trajectory and is then represented by the symbol 22', which projects orthogonally on the trajectory at point M.

Figure 5:
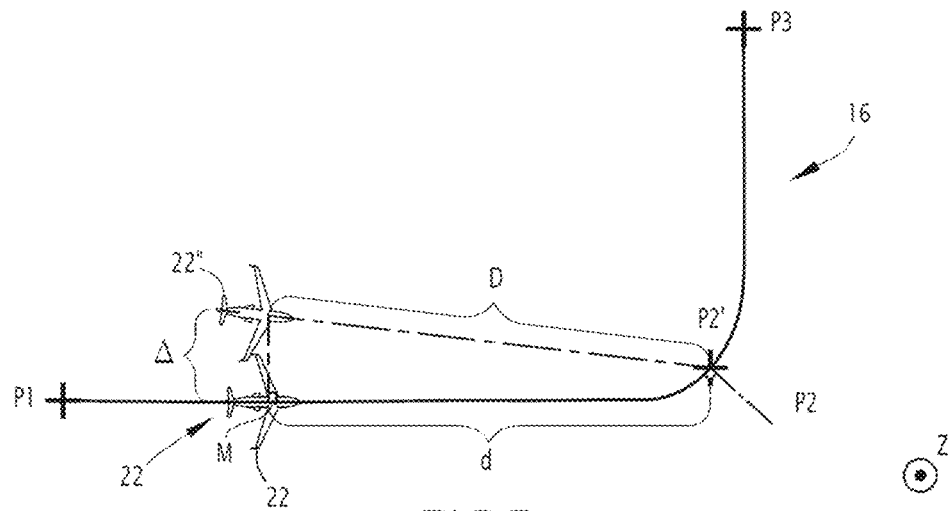
FIG. 5 is a schematic view of a horizontal flight profile in flight plan mode, illustrating the different distance calculations in one embodiment of the invention.
Figure 6:
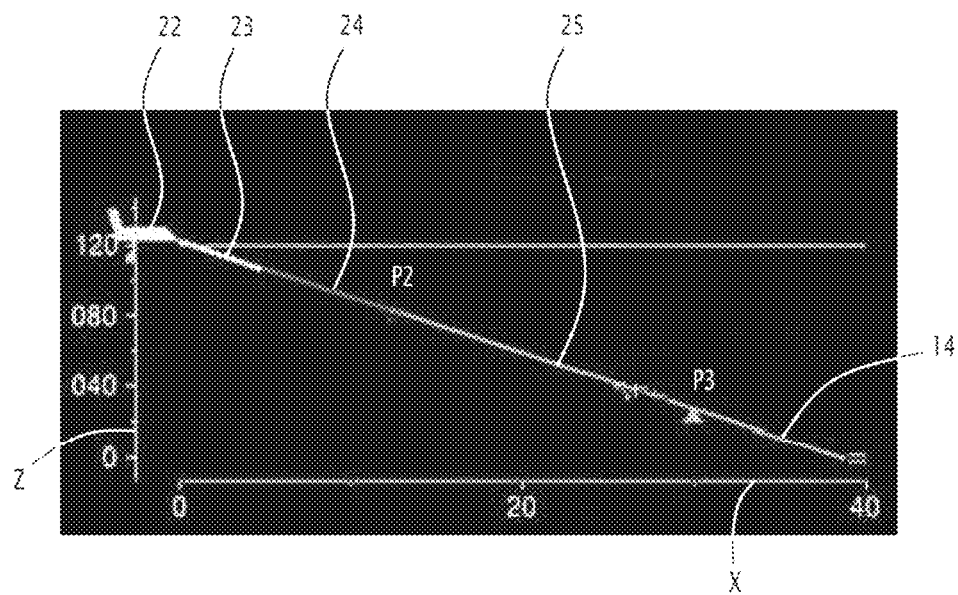
FIG. 6 is a schematic view of the vertical flight profile in flight plan mode, illustrating a display mode A1 according to the invention.

FIG. 5 is similar to FIG. 7, except that the predefined lateral trajectory 16 is curvilinear and the waypoint P2 is situated next to the predefined trajectory and projects perpendicularly on the latter at P2'.

In step 107 corresponding to a mode called mode B for determining the vertical profile 14, the calculating module 24 also performs all of the operations described for step 103, with the exception that the coordinate of P2 on the axis X is distant by the value D of the coordinate of the symbol 22 along the axis X and not by the value d. And D is determined by the calculating module 24 as being equal to the distance between the current position of the aircraft and the orthogonal projection of the next waypoint of the aircraft on the predefined lateral trajectory, this distance being either the orthodromic distance, or, in particular if D<10 Nm, the length of the orthogonal projection in a plane perpendicular to Z, of the segment having, as ends, said current position of the aircraft and said orthogonal projection of the next waypoint.

This distance D is indicated in FIGS. 5 and 7 in the case of the two situations mentioned in reference to each of these figures.

The calculating module 24 further determines the respective forms in which the symbols 22 of the aircraft will be displayed, those of the waypoints P1, P2, P3, the trajectory portions between these points, the speed vector, etc.

In the considered embodiment, the calculating module 24 performs specific processing operations depending on whether the deviation Δ is less than or greater than a determined threshold Δ12 with a value below ΔAB (therefore only relative to mode A), to determine these displays. Thus, if after comparison, in a step 104, between Δ and Δ12 by the calculating module 24, the latter determines that Δ is less than Δ12, then the calculating module 24 selects a mode A1 for determining the vertical profile 14, and if not, the calculating module 24 selects a mode A2 for determining the vertical profile 14. The modes A1 and A2 are both part of the mode A and are outlined hereinafter.

And in the considered embodiment, in mode B, the calculating module 24 further performs specific processing operations depending on whether the mode B results from a non-managed piloting mode Cd or a deviation value Δ greater than ΔAB. Thus, if mode B results from a non-managed piloting mode Cd, the calculating module 24 selects a mode B1 for determining the vertical profile 14 and if mode B results from a deviation value greater than ΔAB, the calculating module 24 selects a mode B2 for determining the vertical profile 14. The modes B1, B2 are outlined hereinafter.

Then the display module 34 commands the display, on the display screen 18, of the vertical profile thus defined by the calculating module 24.

Examples of vertical flight display definitions 14 done by the calculating module 24 in modes A1, A2, B1 and B2 are now described in more detail in reference to FIGS. 6 to 10, in the case of an airplane 12.

Mode A1: this mode for determining a vertical flight plan display 14 therefore corresponds to managed piloting. The aircraft 12 follows the lateral trajectory from the flight plan (the deviation Δ is less than Δ12), the LNAV is engaged, the depiction of the elements (aircraft symbol 22, speed vector 23, segment of the flight plan 24 between the symbol 22 and the next waypoint P2 and flight plan segment 25 between the next waypoint P2 and the following one P3) is conventional, shown schematically in FIG. 6. The next waypoint P2 is displayed on the distance axis X at the value d. The active part of the flight plan, in the process of being flown, here the section 24 at segment P1P2 remaining to be traveled is shown separately from the other sections of the flight plan shown (for example P2P3), for example in magenta.

Figure 8:
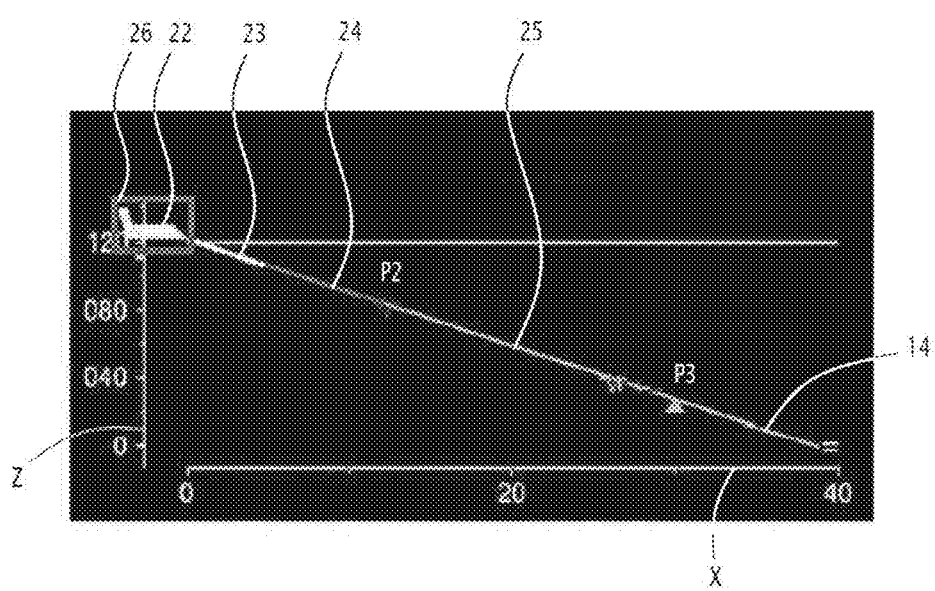
FIG. 8 is a schematic view of the vertical flight profile in flight plan mode, illustrating a display mode A2 according to the invention.

Mode A2: in this embodiment, the vertical flight display 14 of which is shown schematically in FIG. 8, the aircraft 12 is moderately distanced from the lateral trajectory from the flight plan (the deviation Δ is greater than Δ12 but less than ΔAB). In this case, relative to the display in mode A1, the computing module 24 adds a symbol to indicate that the airplane is in the process of deviating from the route while LNAV is engaged. In one embodiment, the symbol is embodied by the box 26 around the symbol 22 of the model airplane. A dedicated color, for example magenta, is used for the box 26, to identify that the PA is still in managed mode. Depending on the cockpit of the aircraft, a color code other than magenta or an additional symbol other than the box can be used. This depiction makes it possible to understand that although the airplane and the trajectory appear to be superimposed in the VD, they are not superimposed on the lateral plane. This intermediate display makes it possible to understand what will happen if the airplane continues to move away from the predefined lateral trajectory.

Figure 9:
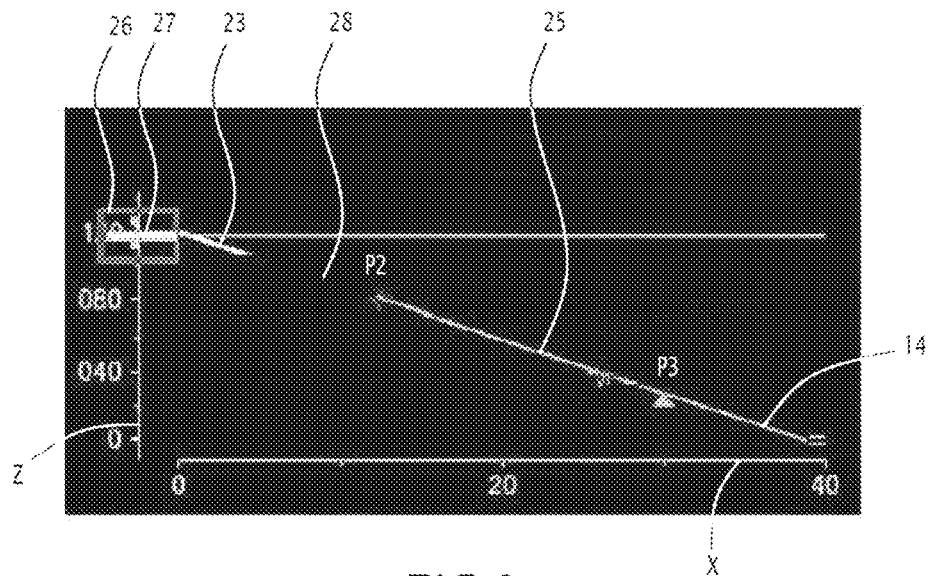
FIG. 9 is a schematic view of the vertical flight profile in flight plan mode, illustrating a display mode B1 according to the invention.

Mode B1: in this embodiment, the vertical flight display 14 of which is shown schematically in FIG. 9, the aircraft 12 is distanced or significantly from the lateral trajectory from the flight plan (the deviation Δ is greater than ΔAB). In this case, relative to the display in mode A2, the calculating module 24 changes the symbol 22 representing the model airplane. The new depiction (a dash at the current altitude in the illustrated example) has the particularity relative to the original of no longer representing an airplane direction (front/rear) on the VD. This depiction embodies the fact that the airplane can be in the process of moving away from the next flight plan point P2 displayed on the VD. This depiction still makes it possible to view the altitude of the airplane, and therefore the altitude deviation with respect to upcoming points of the flight plan. The symbol added during the display of A2 is preserved. It continues to indicate that there is a lateral deviation between the airplane and the trajectory and that LNAV is engaged. The first segment 24 of the trajectory (between the airplane symbol and the point P2) is further deleted from the display by the calculating module 24 and leaves room for an empty space 28. This makes it possible to reflect, clearly and unambiguously, the fact that the airplane is not in the process of flying the correct vertical segment. The next waypoint of the flight plan, P2, is displayed at the distance D corresponding to the direct distance between the airplane and the projection of P2 on the predefined lateral trajectory. As a result, if the airplane moves away from the point P2, the display is coherent: one indeed sees the point P2 move away from the airplane symbol 22 on the VD. The exact trajectory for the airplane to rejoin the next point P2 is not determined. As a result, while the VD presents additional information in modes A1, A2 such as the terrain, the weather or the traffic, in mode B1, the calculating module does not indicate any of this information between the airplane and P2 in the definition of the display VD in mode B1.

Figure 10:
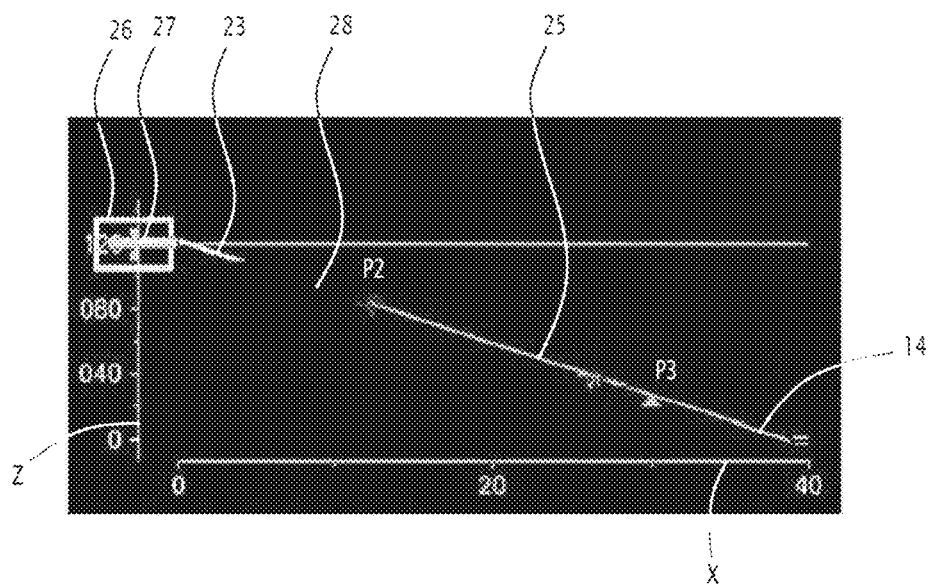
FIG. 10 is a schematic view of the vertical flight profile in flight plan mode, illustrating a display mode B2 according to the invention.

Mode B2: in this mode, the vertical flight display 14 of which is illustrated schematically in FIG. 10, the aircraft 12, the pilot has selected, on automatic pilot, another lateral guide mode, not necessarily aiming to follow the flight plan, the calculating module 24 adapts the depiction on the VD similarly to mode B1 with the following particularity: an additional symbol depicts the fact that the PA of the airplane is no longer in managed mode. In one example, this symbol is embodied by the box 29 in cyan around the symbol 22 of the model airplane. Depending on the cockpit of the aircraft, a color code other than cyan or a symbol other than the box can be used. Here again, since the first segment of the trajectory is deleted from the display, the fact that the airplane is not in the process of flying over the current horizontal segment is embodied clearly and unambiguously. Additionally, the next waypoint P2 of the flight plan is displayed at the distance D, corresponding to the direct distance between the airplane and the projection of P2 on the predefined lateral trajectory. If the airplane moves away from P2, the display is coherent: one indeed sees the symbol designating P2 move away from the airplane symbol 22. And like in B1, the calculating module 24 does not indicate any of this additional information like the terrain, the weather, or the traffic between the airplane and P2 in the definition of the display VD in mode B1.

There are different methods making it possible to determine the condition causing the transition from display A (or A1 or A2) to B, and further in the considered embodiment, from display A1 to A2.

For example, in one embodiment, the change occurs when an absolute distance deviation threshold (in Nm) is reached, as indicated above. In one embodiment, this threshold is a ratio of the required navigation performance (RNP) on the current flight portion. For example, the threshold $\Delta 12$ is chosen equal to $\alpha_{12}.RNP$ and the threshold ΔAB is chosen equal to $\alpha_{AB}.RNP$, with $\alpha_{12} < \alpha_{AB}$. Typically, the RNP assumes a value from 0.1 Nm (nautical miles) to 10 Nm and varies based on the segments of the flight plan. For example, $\alpha_{12} = \frac{1}{2}$ and $\alpha_{AB} = 1$.

More complex conditions for triggering a mode change will take account of additional parameters such as the speed of separation of the aircraft relative to the lateral trajectory, the angle deviation between the movement axis of the aircraft (or the axis of the fuselage of the airplane) and the current axis of the trajectory, etc.

In other embodiments, the display modes of A, B (and/or A1, B2 and/or B3) can be done in non-managed piloting mode.

In the case of an aircraft that initially indeed follows its predefined lateral trajectory and then moves further and further away from it, for example in the case of an overflight constraint of a waypoint P2, the display VD will thus first correspond to mode A1, then it will switch to mode A2 upon approaching P2, and lastly to mode B1 before returning to A2 once it has passed the point P2, then to A1. In the two modes A1 and A2, the first waypoint is displayed on the distance axis at the value d corresponding to the distance between the projection of the airplane on the lateral trajectory and the projection of the next waypoint on the lateral trajectory, then in mode B1, it will be the distance D.

The proposed solution makes it possible to keep a high-performance flight plan display VD when the airplane is no longer guided on the lateral flight plan and/or when it moves away from the lateral trajectory.

Continuously displaying the VD in flight plan mode makes it possible to keep the display of the vertical references of the flight plan and therefore to anticipate a future rejoining of the flight plan.

The behavioral prediction of the airplane in the vertical plane is improved during non-managed to managed flight transitions.

The altitude reference (current altitude of the airplane) of the airplane continues to be displayed, which makes it possible to keep good awareness of the vertical situation.

The solution makes it possible to view, on the VD, the beginning of the distancing of the current position of the aircraft from the lateral trajectory. There is therefore a gentle transition between the proposed displays.

The solution also makes it possible to recall the lateral mode of the engaged automatic pilot: the magenta color of the box in managed mode corresponds to the color used in the avionics suite for all displays of inputs and modes relative to a managed PA mode; likewise, cyan corresponds to the color used in the avionics suite for all displays of inputs and modes relative to a non-managed PA mode. This makes it possible to improve the awareness of the state of the PA.

The solution does not cause an abrupt automatic transition between 2 different display modes.

The solution does not require developing a VD in track mode.

The invention claimed is:

1. A method for managing the display of a vertical flight profile of an aircraft for which a trajectory has been predefined by a flight plan comprising a set of waypoint(s), the method being implemented by an electronic management device and comprising the following steps:
defining the display of a vertical flight profile of the aircraft comprising a first reference axis on the y-axis representing the altitude and a second reference axis on the x-axis representing a distance, and indicating, relative to these axes, the position of the aircraft, and at least the next waypoint along the predefined trajectory;
wherein the method further comprises the following steps:
a predefined lateral trajectory being the predefined trajectory projected in a plane perpendicular to the first axis, determining a deviation between the current position of the aircraft projected in said plane perpendicular to the first axis and the predefined lateral trajectory;
as a function of at least the determined deviation, selecting a mode from among a set of display modes of said vertical flight profile comprising at least a first mode and a second mode; and
when the first mode has been selected, calculating a first value equal to the distance between an orthogonal projection of the current position of the aircraft on the predefined lateral trajectory and the orthogonal projection of the next waypoint of the aircraft on the predefined lateral trajectory, and displaying, in the vertical flight profile, the next waypoint at a distance from the aircraft along the second reference axis equal to the first calculated value;
when the second mode has been selected, calculating a second value equal to the distance between the current position of the aircraft considered in the plane of the lateral trajectory and the orthogonal projection of the next waypoint of the aircraft on the predefined lateral trajectory, and displaying, in the vertical flight profile, the next waypoint at a distance from the aircraft along the second reference axis equal to said second calculated value.

2. The method for managing the display of a vertical flight profile of an aircraft according to claim 1, wherein the first mode is selected when the determined deviation is below a first deviation threshold and the second mode is selected when the determined deviation is above said first deviation threshold.

3. A non-transitory computer-readable medium on which is stored a program comprising software instructions which, when executed by a computer, carry out a method according to claim 2.

4. The method for managing the display of a vertical flight profile of an aircraft according to claim 2, comprising the following steps:
comparing the determined deviation to a second deviation threshold lower than the first deviation threshold, and
if the determined deviation is above the second deviation threshold, displaying, on the vertical flight profile, an indication signaling that the aircraft has moved away from the predefined trajectory.

5. A non-transitory computer-readable medium on which is stored a program comprising software instructions which, when executed by a computer, carry out a method according to claim 4.

6. The method for managing the display of a vertical flight profile of an aircraft according to claim 1, wherein the selection of said mode is further a function of received information indicating whether the flight of the aircraft is currently automatically slaved to said predefined trajectory.

7. A non-transitory computer-readable medium on which is stored a program comprising software instructions which, when executed by a computer, carry out a method according to claim 6.

8. The method for managing the display of a vertical flight profile of an aircraft according to claim 1, wherein the first deviation threshold is defined as a ratio of a required positioning precision on the current portion of the trajectory according to the flight plan.

9. A non-transitory computer-readable medium on which is stored a program comprising software instructions which, when executed by a computer, carry out a method according to claim 8.

10. The method for managing the display of a vertical flight profile of an aircraft according to claim 1, wherein the distance corresponding to said first value and/or said second value and/or said deviation is calculated as orthodromic distance.

11. A non-transitory computer-readable medium on which is stored a program comprising software instructions which, when executed by a computer, carry out a method according to claim 10.

12. A non-transitory computer-readable medium on which is stored a program comprising software instructions which, when executed by a computer, carry out a method according to claim 1.

13. An electronic device for managing the display of a vertical flight profile of an aircraft for which a trajectory has been predefined by a flight plan comprising a set of waypoint(s), said electronic device being suitable for
defining the display of a vertical flight profile of the aircraft comprising a first reference axis on the y-axis representing the altitude and a second reference axis on the x-axis representing a distance, and indicating, relative to these axes, the position of the aircraft, and at least the next waypoint along the predefined trajectory;
wherein
the device is capable, a predefined lateral trajectory being the predefined trajectory projected in a plane perpendicular to the first axis, of determining a deviation between the current position of the aircraft projected in said plane perpendicular to the first axis and the predefined lateral trajectory;
the device is capable, as a function of at least the determined deviation, of selecting a mode from among a set of display modes of said vertical flight profile comprising at least a first mode and a second mode; and
in order, when the first mode has been selected, calculating a first value equal to the distance between an orthogonal projection of the current position of the aircraft on the predefined lateral trajectory and the orthogonal projection of the next waypoint of the aircraft on the predefined lateral trajectory, to command the display, in the vertical flight profile, of the next waypoint at a distance from the aircraft along the second reference axis equal to the first calculated value;
in order, when the second mode has been selected, calculating a second value equal to the distance between the current position of the aircraft considered in the plane of the lateral trajectory and the orthogonal projection of the next waypoint of the aircraft on the predefined lateral trajectory, to command the display, in the vertical flight profile, of the next waypoint at a distance from the aircraft along the second reference axis equal to said second calculated value.

14. The electronic device for managing the display of a flight profile according to claim 13, capable of selecting the first mode when the determined deviation is below a first deviation threshold and of selecting the second mode when the determined deviation is above said first deviation threshold.

15. An electronic system for displaying a flight profile of an aircraft, the system comprising:
   a display screen; and
   the electronic management device of claim 14 configured to command the display of the flight profile on the display screen.

16. An electronic system for displaying a flight profile of an aircraft, the system comprising:
   a display screen; and
   the electronic management device of claim 13 configured to command the display of the flight profile on the display screen.

\* \* \* \* \*